(12) United States Patent
Chang et al.

(10) Patent No.: US 9,001,071 B2
(45) Date of Patent: *Apr. 7, 2015

(54) ENERGY-EFFICIENT TOUCH PANEL DEVICE AND RELATED METHOD

(75) Inventors: Hui-Hung Chang, Keelung (TW);
He-Wei Huang, Hsinchu (TW);
Tsung-Yin Yu, Yilan County (TW);
Chih-Yuan Chang, Changhua County (TW)

(73) Assignee: NOVATEK Microelectronics Corp., Hsinchu Science Park, Hsin-Chu (TW)

( * ) Notice: Subject to any disclaimer, the term of this patent is extended or adjusted under 35 U.S.C. 154(b) by 529 days.

This patent is subject to a terminal disclaimer.

(21) Appl. No.: 13/350,798

(22) Filed: Jan. 15, 2012

(65) Prior Publication Data

US 2012/0105372 A1 May 3, 2012

Related U.S. Application Data

(63) Continuation-in-part of application No. 12/499,090, filed on Jul. 8, 2009, now Pat. No. 8,115,747.

(30) Foreign Application Priority Data

Feb. 23, 2009 (TW) .............................. 098105616 A (51) Int. Cl.
*G06F 3/045* (2006.01)
*G06F 1/32* (2006.01)

(52) U.S. Cl.
CPC ............ *G06F 1/3203* (2013.01); *G06F 1/3262* (2013.01)

(58) Field of Classification Search
None
See application file for complete search history.

(56) References Cited

U.S. PATENT DOCUMENTS

| 3,571,807 | A | * | 3/1971 | Candy et al. | 345/536 |
| 4,599,689 | A | * | 7/1986 | Berman | 710/22 |
| 5,294,928 | A | * | 3/1994 | Cooper et al. | 341/142 |
| 5,485,625 | A | | 1/1996 | Gumkowski | |
| 5,661,848 | A | * | 8/1997 | Bonke et al. | 711/112 |
| 5,714,955 | A | | 2/1998 | Reay | |
| 5,890,799 | A | * | 4/1999 | Yiu et al. | 713/321 |
| 6,054,979 | A | | 4/2000 | Sellers | |
| 6,681,332 | B1 | | 1/2004 | Byrne | |
| 6,782,472 | B2 | * | 8/2004 | Jain et al. | 713/2 |
| 6,831,583 | B1 | * | 12/2004 | O'Dowd et al. | 341/155 |
| 7,117,379 | B2 | * | 10/2006 | Hamilton | 713/320 |
| 7,573,416 | B1 | | 8/2009 | Ren | |
| 2002/0091952 | A1 | * | 7/2002 | Lin et al. | 713/300 |
| 2003/0011499 | A1 | * | 1/2003 | Amar et al. | 341/155 |
| 2004/0140958 | A1 | * | 7/2004 | Tsai et al. | 345/173 |
| 2004/0257042 | A1 | | 12/2004 | Liu | |
| 2006/0170398 | A1 | | 8/2006 | Gangsto | |
| 2007/0257642 | A1 | * | 11/2007 | Xiao et al. | 320/134 |
| 2007/0291016 | A1 | * | 12/2007 | Philipp | 345/174 |
| 2008/0007536 | A1 | * | 1/2008 | Jeon et al. | 345/173 |
| 2008/0122872 | A1 | * | 5/2008 | Hsu et al. | 345/667 |

(Continued)

*Primary Examiner* — Antonio Xavier
(74) *Attorney, Agent, or Firm* — Winston Hsu; Scott Margo (57) ABSTRACT

An energy-efficient touch panel control device includes a touch panel, a buffer memory, an analog to digital conversion unit, for converting analog output voltage to digital trace data and storing the digital trace data in the buffer memory, and according to a control signal, switching an operating mode, an operation unit, generating a detecting result according to the digital trace data, switching the operating mode according to an interrupt signal, and including a mode control unit, for generating the control signal according to the interrupt signal, and a host interface unit.

5 Claims, 8 Drawing Sheets

(56) References Cited

U.S. PATENT DOCUMENTS

| | | | |
|---|---|---|---|
| 2008/0162997 A1* | 7/2008 | Vu et al. | 714/27 |
| 2009/0100933 A1* | 4/2009 | Brunson et al. | 73/577 |
| 2009/0289908 A1* | 11/2009 | Chen et al. | 345/173 |
| 2010/0026845 A1* | 2/2010 | Kang et al. | 348/231.2 |
| 2010/0214255 A1* | 8/2010 | Chang et al. | 345/174 |
| 2010/0268852 A1* | 10/2010 | Archer et al. | 710/22 |

\* cited by examiner

ENERGY-EFFICIENT TOUCH PANEL DEVICE AND RELATED METHOD

CROSS REFERENCE TO RELATED APPLICATIONS

This is a continuation-in-part application of U.S. application Ser. No. 12/499,090, filed Jul. 8, 2009, which is included herein by reference.

BACKGROUND OF THE INVENTION

1. Field of the Invention

The present invention is related to an energy-efficient touch panel device and related method, and more particularly, to a touch panel device and related method which can consume less power and have a long standby time.

2. Description of the Prior Art

For years, most IT products utilized traditional ways like keyboards or mouse as the standard user interfaces. After the touch panel devices emerged as a new type of user interface, people start to enjoy it as a very convenient way to input command by selecting objects on the screen. On the other hand, as the concept of environmental protection draws more and more attention, and as new generations of IT products appear on the market, the concepts of "green product" gradually influence all design and manufacturing works of the IT products, which include the touch panel device. Besides that, saving power consumption can have other benefits, too; for example, the standby time of the IT product can be extended, and the users need not to charge the battery of the device very often, so the users' convenience can be advanced.

Figure 1:
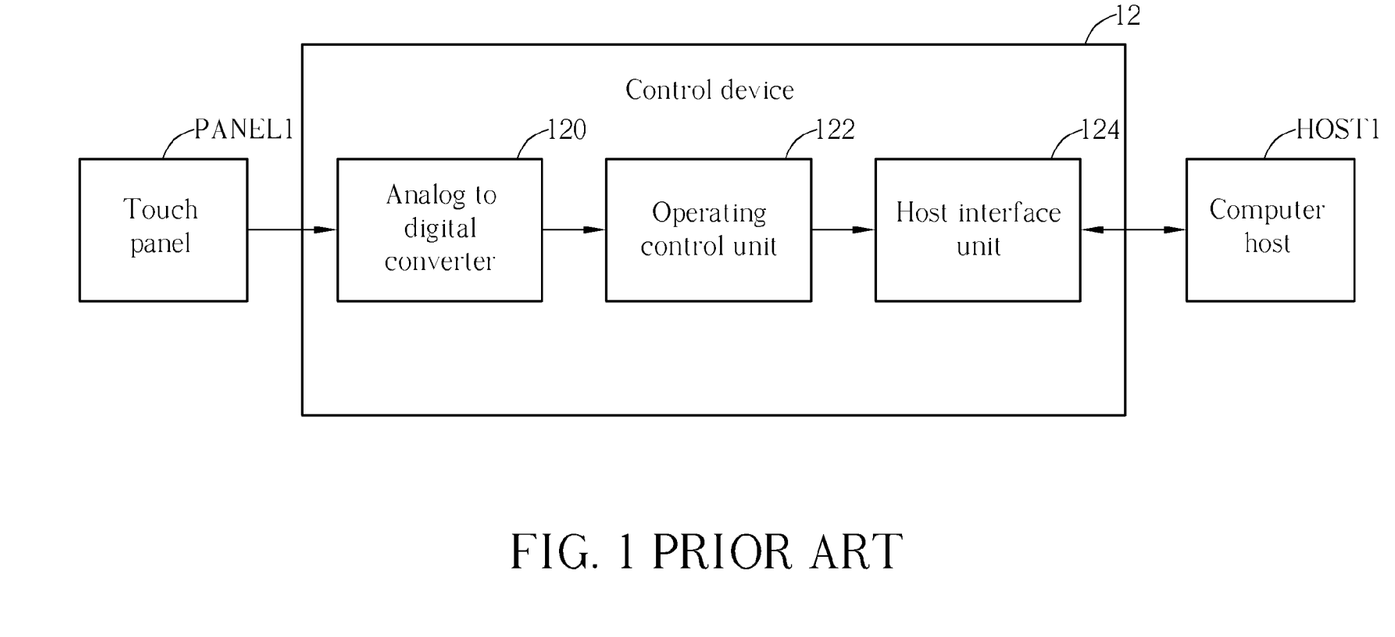
FIG. 1 illustrates a schematic diagram of a touch panel and a control device according to the prior art.

The touch panel and related control device are mostly seen in the portable IT products. Please refer to FIG. 1. FIG. 1 illustrates a schematic diagram of a touch panel PANEL1 and a control device 12 according to the prior art. The touch panel PANEL1 usually includes many traces in the horizontal direction (X trace) and vertical direction (Y trace), for forming the touch panel functions on the touch panel; these traces are used for sensing the human body's capacitance in order to generate analog output voltages. Meanwhile, according to the operating principles of the touch panel, different traces correspond to different capacitive load parameters.

When a touch event happens to the touch panel PANEL1, the analog output voltages of some horizontal traces as well as some vertical traces may change according to where the touch event happened, and the control device 12 can detect the touch event by monitoring the analog output voltage of each trace. Inside FIG. 1, connected to the touch panel PANEL1, there is a control device 12, which includes an analog to digital converter 120, an operating control unit 122 and a host interface unit 124. The analog to digital converter 120, directly connected to the touch panel PANEL1, is used for converting the analog output voltages into some data in digital format, and the resulting digital data is then transferred to the operating control unit 122. The operating control unit 122 performs specific algorithms to process the data to judge whether there exists a touch event. When the operating control unit 122 confirms a touch event, the host interface unit 124 will output a message to a computer host HOST1 to notify the happening of the touch event. Noticeably, since different traces in the touch panel have different capacitive load parameters, every time the analog to digital converter 120 converts an analog output voltage, the analog to digital converter 120 needs to regulate its transfer ratio (magnitude of amplification) based on the capacitive load parameter of the corresponding trace, such that the influence of different capacitive load corresponding to different trace can be erased (normalized). By this way, the digital data output by the analog to digital converter 120 can be normalized by the analog to digital converter 120, and the operating control unit 122 can perform data operations based on those normalized data.

Noticeably, inside the control device 12, between the operating control unit 122 and the analog to digital converter 120, the capacitive load parameters, used for regulating the transfer ratio of the analog to digital converter, are supplied by the operating control unit 122 once at a time. In other words, every time the analog to digital converter 120 performs a conversion, only one corresponding capacitive load parameter is transferred from the operating control unit 122 to "update" the transfer ratio of the analog to digital converter 120. Meanwhile, right after each analog to digital conversion, the digital output is directly transferred to the operating control unit 122. Therefore, based on the operating principles described above, the control device 12 has been busy on sending capacitive load parameters to and receiving data from the analog to digital converter 120, and could consume electric power unnecessarily, such that the standby time of the touch panel device cannot be reasonably extended, and user's convenience cannot be improved, either.

SUMMARY OF THE INVENTION

It is therefore a primary objective of the claimed invention to provide an energy-efficient touch panel device and related method.

The present invention discloses an energy-efficient touch panel control device, which comprises a touch panel comprising a plurality of horizontal traces and a plurality of vertical traces, corresponding to a plurality of capacitive load parameters, for generating a plurality of analog output voltages; a buffer memory for storing data; an interrupt initiation unit, for counting a data number of the data stored in the buffer memory, and outputting an interrupt signal while the data number is greater than or equal to a predefined value; an analog to digital conversion unit, coupled to the touch panel and the buffer memory, for converting the plurality of analog output voltages to a plurality of digital trace data and storing the plurality of digital trace data in the buffer memory, and switching an operating mode according to a control signal; an operation unit, coupled to the buffer memory, for generating a detecting result according to the plurality of digital trace data, and switching the operating mode according to the control signal; a mode control unit, coupled to the interrupt initiation unit, the operation unit and the analog to digital conversion unit, for generating the first control signal to the analog to digital conversion unit, and the second control signal to the operation unit according to the interrupt signal; and a host interface unit, coupled to the operation unit, for transmitting a touch event message to a computer host according to the detecting result.

The present invention further discloses an energy-efficient touch panel control method, which comprises utilizing an analog to digital conversion unit to transform a plurality of analog output voltages into a plurality of digital trace data according to a plurality of capacitive load parameters; storing the plurality of the digital trace data into a buffer memory; and controlling operating modes of the analog to digital conversion unit and an operation unit according to a data number of the data stored in the buffer memory.

The present invention further discloses an energy-efficient touch panel control device. The energy-efficient touch panel control device includes a touch panel comprising a plurality of horizontal traces and a plurality of vertical traces, corresponding to a plurality of capacitive load parameters, for generating a plurality of analog output voltages; a buffer memory for storing digital trace data; an analog to digital conversion unit, coupled to the touch panel and the buffer memory, for converting the plurality of analog output voltages to a plurality of digital trace data and storing the plurality of digital trace data in the buffer memory, and switching an operating mode according to a control signal; an operation unit, coupled to the buffer memory, for generating a detection result according to the plurality of digital trace data read from the buffer memory, and switching the operating mode according to an interrupt signal outputted when the number of digital trace data stored in the buffer memory is greater than or equal to a predefined value, wherein the operation unit includes a mode control unit, coupled to the analog to digital conversion unit, for generating the control signal for the analog to digital conversion unit; and a host interface unit, coupled to the operation unit, for transmitting a touch event message to a computer host according to the detection result; wherein the mode control unit is utilized for generating the first control signal according to the interrupt signal such that the analog to digital conversion unit is operated in a sleep mode and the operation unit is operated in an active mode; and wherein the mode control unit is utilized for generating the first control signal after the operating unit completes generating the detection result such that the analog to digital conversion unit is operated in an active mode and the operation unit is operated in a sleep mode.

The present invention further discloses an energy-efficient touch panel control method. The energy-efficient touch panel control method includes transforming a plurality of analog output voltages into a plurality of digital trace data according to a plurality of capacitive load parameters by an analog to digital conversion unit; storing the plurality of the digital trace data into a buffer memory; and controlling operating modes of the analog to digital conversion unit and an operation unit according to a data number of the data stored in the buffer memory; wherein the analog to digital conversion unit is operated in a sleep mode, and the operation unit is operated in an active mode when the data number is greater than or equal to a predefined value, such that the operation unit processes the data stored in the buffer memory; and wherein the analog to digital conversion unit is operated in an active mode, and the operation unit is operated in a sleep mode, after the operation unit completing processing the data stored in the memory buffer.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
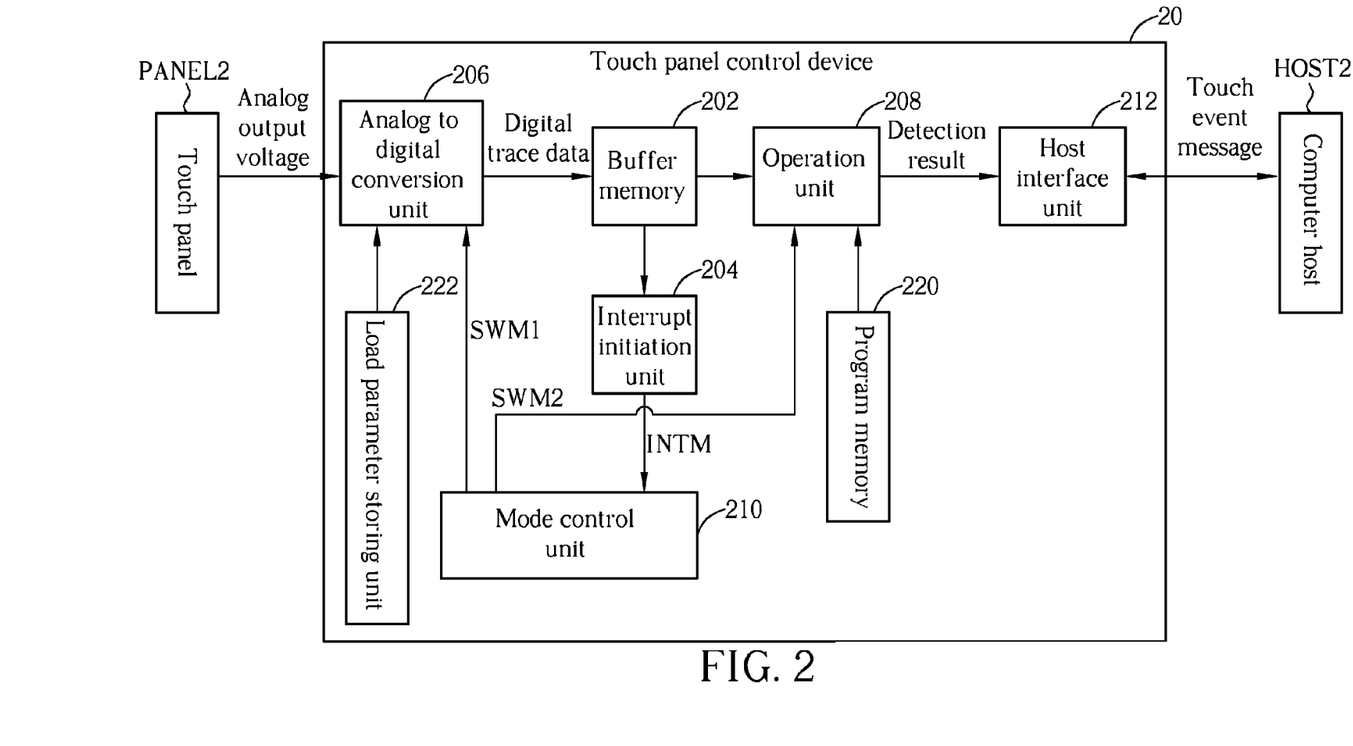
FIG. 2 illustrates a schematic diagram of a touch panel control device according to the present invention.

Please refer to FIG. 2, which illustrates a schematic diagram of a touch panel control device 20 according to the present invention. The touch panel control device 20, connected to a touch panel PANEL2, is used for detecting the presence of a touch event and sending the detection result to a computer host HOST2. The touch panel control device 20 comprises a buffer memory 202, an interrupt initiation unit 204, an analog to digital conversion unit 206, an operation unit 208, a mode control unit 210 and a host interface unit 212.

The operations of the touch panel control device 20 are described as follows. First, the mode control unit 210 sets the analog to digital conversion unit 206 to work in an active mode, and sets the operation unit 208 to stay in a sleep mode. The analog to digital conversion unit 206 converts the analog output voltages to digital trace data by referring the traces' capacitive load parameters, and stored in the buffer memory 202. The buffer memory 202 supplies a memory space for temporarily storing the digital trace data, and the interrupt initiation unit 204 is responsible for counting the number of digital trace data stored in the buffer memory 202. Besides, when the number of digital trace data stored in the buffer memory 202 is equal to or greater than a preset value MLEVEL, the interrupt initiation unit 204 will submit an interrupt signal INTM, and the mode control unit 210 will generate control signals, SWM1 and SWM2 according to the interrupt signal INTM. The analog to digital conversion unit 206 will switch its operating mode according to the control signal SWM1, and the operation unit 208 will switch its operating mode according to the control signal SWM2. Preferably, for the present case, the control signal SWM1 switches the analog to digital conversion unit 206 to a sleep mode, and the control signal SWM2 switches the operation unit 208 to an active mode, such that the electric power can be saved by turning the analog to digital conversion unit 206 into an idle condition. Besides, preferably, the preset value MLEVEL, used for setting a limit on the number of digital trace data in the buffer memory 202, is less than or equal to the data capacity of the buffer memory 202.

On the other hand, the operation unit 208 reads the digital trace data in the buffer memory 202, performs algorithmic operations, and generates a detection result. When the operation unit 208 completes the algorithmic operation and generates a detection result, all the data stored in the buffer memory 202 should have been consumed (read) by the operation unit 208, the mode control unit 210 can then switch the operation mode of the switch touch panel control device 20 via the control signals, SWM1 and SWM2. Preferably, for the present condition, the control signal SWM1 switches the analog to digital conversion unit 206 back to work in an active mode, and the control signal SWM2 switches the operation unit 208 into a sleep mode; by following this procedure, the electric energy can be saved by turning the operation unit 208 into an idle state.

As stated above, the mode control unit 210 is used for generating the control signals, SWM1 and SWM2, which are used for controlling the operation modes of the analog to digital conversion unit 206 and the operation mode 208, respectively, such that the electric energy can be saved. Noticeably and preferably, the control signals, SWM1 and SWM2, can be implemented as a single control signal, or can be two different control signals. On the other hand, the host interface unit 212 is in charge of transferring a touch event message to the computer host HOST2. Besides that, the touch panel control device 20 includes a non-volatile program memory 220, which is connected to the operation unit 208, and is used for storing the software code used for the operations of the operation unit 208 as well as the capacitive load parameters of all the traces. Meanwhile, the touch panel control device 20 includes a load parameter storing unit 222 directly connected to the analog to digital conversion unit 206. Preferably, every time when the system is reset or bootstrapped, the operation unit 208 is responsible for transferring every capacitive load parameters stored in the program memory 220 and storing them in the load parameter storing unit 222. After that, the analog to digital conversion unit 206 can access any of the capacitive load parameters directly from the load parameter storing unit 222. Besides, preferably, the buffer memory 202 and the load parameter storing unit 222 can be implemented as one single memory module, or as two separate memory modules.

Noticeably, the touch panel control device 20 uses the buffer memory 202 to store a large number of data; firstly, by temporarily storing the digital trace data generated by the analog to digital conversion unit 206 to the buffer memory 202, so that the analog to digital conversion unit 206 is not required to output the digital trace data directly to the operation unit 208 every time an analog-to-digital conversion completes. Besides, every time the touch panel control device 20 is bootstrapped or reset, the operation unit 208 coordinates the transfer of load capacitive load parameters from the program memory 220 to the load parameter storing unit 222. Therefore, every time the touch panel control device 20 performs an analog to digital conversion, the analog to digital conversion unit 206 will not require the operation unit 208 to send a corresponding capacitive load parameter; instead, the analog to digital conversion unit 206 can access the corresponding capacitive load parameter directly from the load parameter storing unit 222. Therefore, compared with the prior art, the analog to digital conversion unit 206 can operate independently and complete the analog to digital conversion without the assistance of the operation unit 208.

Most importantly, the touch panel control device 20 can coordinate the analog to digital conversion unit 206 and the operation unit 208 to be operated in an active mode or a sleep mode, such that part of the electric power can be saved. In other words, when the number of digital trace data stored in the buffer memory 202 is equal to or greater than the preset value MLEVEL, the interrupt initiation unit 20 generates an interrupt signal INTM, and then the mode control unit 210 can generate control signals, SWM1 and SWM2, based on the interrupt signal INTM, such that the analog to digital conversion unit 206 enters into a sleep mode, and the operation unit 208 is being "waken up" and enters into an active mode. After the operation unit 208 reads the digital trace data stored in the buffer memory 202, and completes the algorithmic operations about the detection of touch event, the mode control unit 210 wakes up the analog to digital conversion unit 206, and makes it enter into an active mode, and makes the operation unit 208 enter into a sleep mode. By following this process, the analog to digital conversion unit 206 and the operation unit 208 can be put into sleep mode alternatively, so part of the electric power can be saved.

Figure 3:
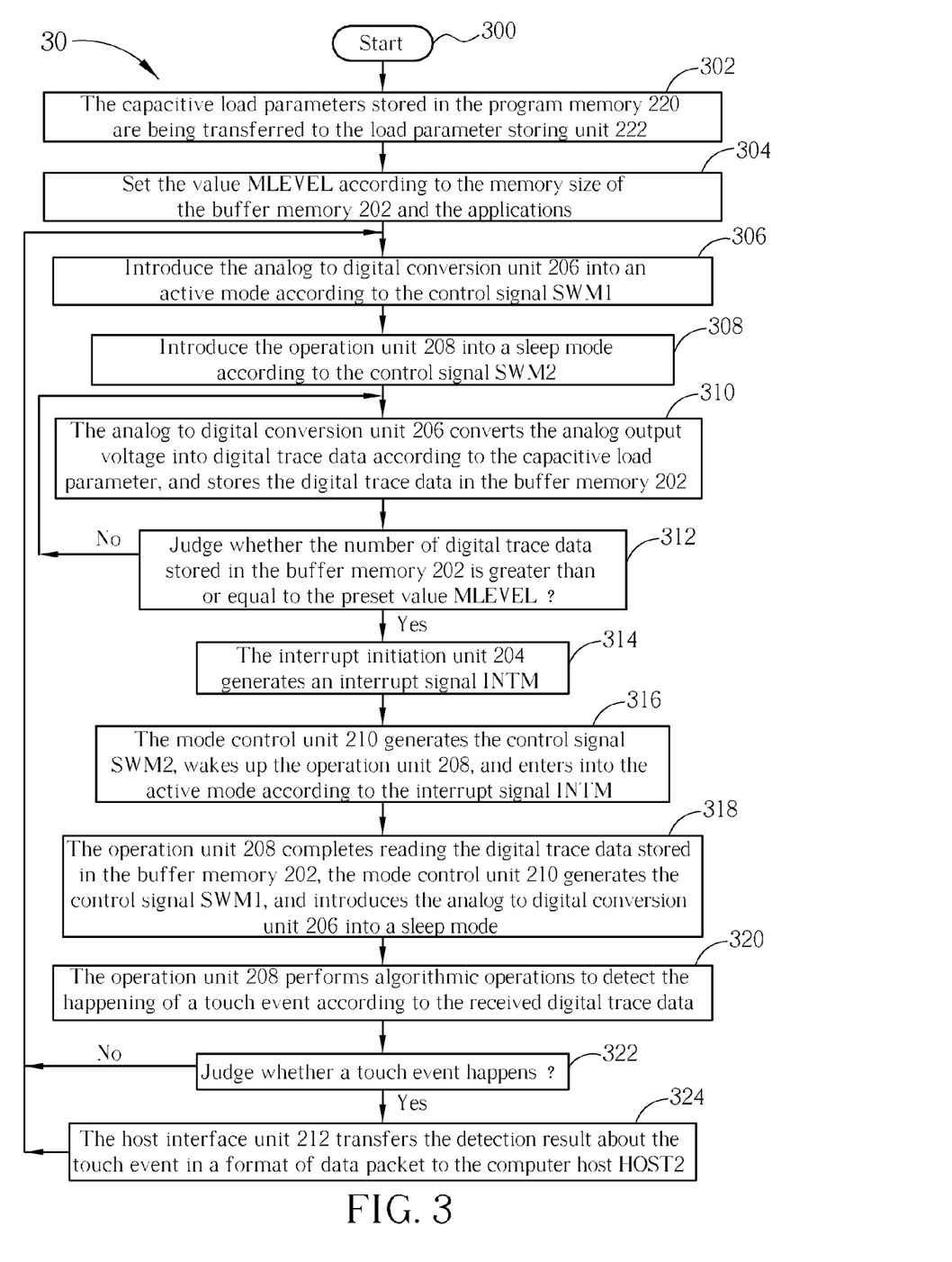
FIG. 3 is a schematic diagram of a process of an embodiment of the present invention applies to the touch panel control device.

To detail more about the operations of the touch panel control device 20, please refer to FIG. 3, which is a schematic diagram of a process 30 of an embodiment of the present invention applies to the touch panel control device 20. It would have been obvious to one of ordinary skill in the art to understand that process 30 is for explaining the methods and the benefits disclosed in the present invention, and is including but not limited just to this. The process 30 comprises the following steps:

STEP 300: Start.
STEP 302: The capacitive load parameters stored in the program memory 220 are being transferred to the load parameter storing unit 222.
STEP 304: Set the value MLEVEL according to the memory size of the buffer memory 202 and the applications.
STEP 306: Introduce the analog to digital conversion unit 206 into an active mode according to the control signal SWM1.
STEP 308: Introduce the operation unit 208 into a sleep mode according to the control signal SWM2.
STEP 310: The analog to digital conversion unit 206 converts the analog output voltage into digital trace data according to the capacitive load parameter, and stores the digital trace data in the buffer memory 202.
STEP 312: Judge whether the number of digital trace data stored in the buffer memory 202 is greater than or equal to the preset value MLEVEL; if not, go back to STEP 310.
STEP 314: The interrupt initiation unit 204 generates an interrupt signal INTM.
STEP 316: The mode control unit 210 generates the control signal SWM2, wakes up the operation unit 208, and enters into the active mode according to the interrupt signal INTM.
STEP 318: The operation unit 208 completes reading the digital trace data stored in the buffer memory 202, the mode control unit 210 generates the control signal SWM1, and introduces the analog to digital conversion unit 206 into a sleep mode.
STEP 320: The operation unit 208 performs algorithmic operations to detect the happening of a touch event according to the received digital trace data.
STEP 322: Judge whether a touch event happens; if not, go back to STEP 306.
STEP 324: The host interface unit 212 transfers the detection result about the touch event in a format of data packet to the computer host HOST2, and go back to STEP 306.

According to process 30, preferably, the STEP 310, 312 and 314 are performed by the analog to digital conversion unit 206 and the interrupt initiation unit 204, and the rest of the STEPs are performed by the operation unit 208 and the mode control unit 210. The related hardware units described in the process 30, and their placements, connection relations and corresponding functions have been disclosed as above, and will not be detailed further.

Figure 4A:
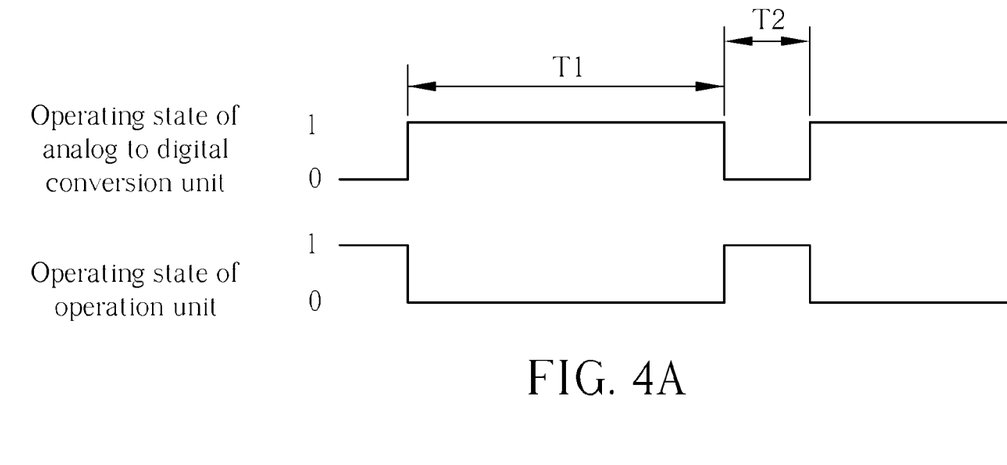
FIGS. 4A and 4B illustrate simplified timing diagrams while varying the memory size of the buffer memory.
Figure 4B:
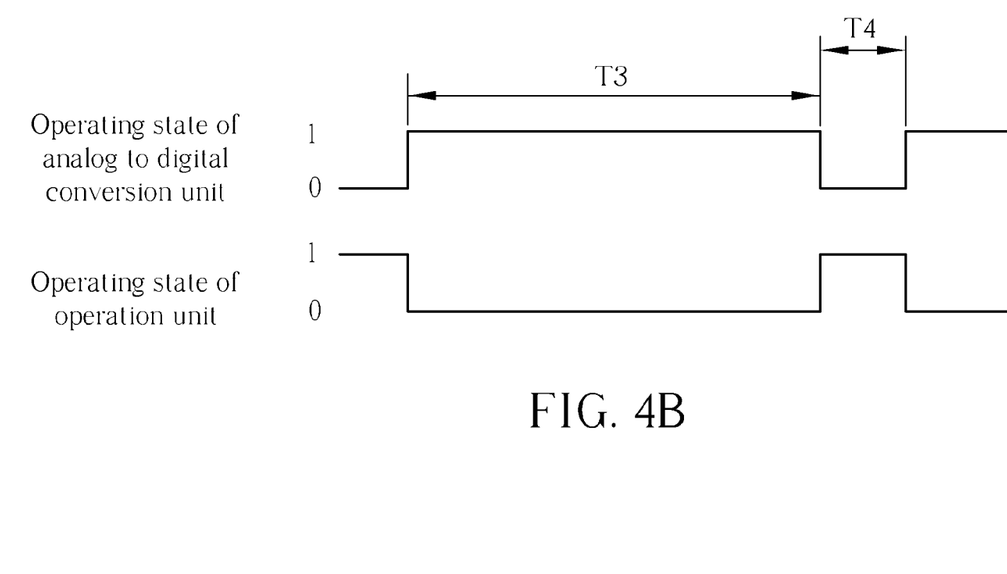

Besides, preferably, the present invention can save more power by increasing the memory size of the buffer memory 202. Please refer to FIGS. 4A and 4B, which illustrate the simplified timing diagrams while varying the memory size of the buffer memory 202. The analog to digital conversion unit 206 and the operation unit 208 alternatively operated in a sleep mode (denoted by 0) or in an active mode (denoted by 1). FIGS. 4A and 4B illustrate the operating states of the analog to digital conversion unit 206 and the operation unit 208 when the size of the buffer memory is L1 and L2 bytes, respectively. By comparing FIGS. 4A and 4B, it can be observed that, when the data capacity of the buffer memory 20 expands, the operation unit 208 will stay longer in the sleep mode, since it will take more time to fill up the buffer memory 202. In other words, if the memory size L2 is greater than the memory size L1, the time interval T3 will be greater than the time interval T1. Besides, since the time interval T2 is approximately equal to the time interval T4, expanding the memory size of the buffer memory 202 can make the operation unit 208 stays in the sleep mode at a greater proportion of time, and then more electric power can be saved. Noticeably, when the time difference between two "wake-ups" of the operation unit 208 has been lengthened, some users may sense the response time of the touch panel control device 20 increased, or the sensitivity decreased. Therefore, the designer is required to find an optimal value for the memory size of the buffer memory 202 by considering the system cost and the sensitivity of the touch panel control device 20.

Noticeably, the present invention can apply a simple hardware module (not shown in the figures), which is specifically used for monitoring the data converted by the analog to digital conversion unit 206, such that the converted data can be checked first to see whether any meaningful message is immersed in the data. Next, only the data with meaningful message and its associated trace position information are transferred to the buffer memory 202. In this case, the operation unit 208 can spend more time to stay in the sleep mode, and the power consumption can be lowered further by adding this hardware function. After all, the operation unit 208 can be waken up and come back in the active mode, and can process only the data with meaningful messages.

According to the experimental results, for the control device 12 of the prior art, the analog to digital converter 120 and the operating control unit 122 are the two most power consuming modules; between them, the operating control unit 122 consumes even more. This is understandable because the operating control module 120 needs to perform the data processing tasks, and to supply the analog to digital converter 120 with characteristic data (capacitive load parameter) of the corresponding trace, and then to receive the digital data output by the analog to digital converter 120 after every analog to digital conversion; all these have to be done in real time, and therefore consume more power. In the prior art, since the analog to digital converter 120 and the operating control unit 122 are operative in the active mode all the time, the power efficiency is therefore relatively poor. In comparison, the average power consumed by the touch panel control device 20 of the present invention is measured and accounts for about 30%-50% of power consumed by the control device 12 of the prior art; this is equally to say that the standby time of the present invention is about 2 to 3 times longer than that of the prior art—the advantage in power saving by the present invention is therefore obvious.

Briefly speaking, according to the present invention, the touch panel control method and device comprises a buffer memory, which is connected between the analog to digital conversion unit and the operation unit, for data buffering. Also, according to the present invention, the touch panel control method and device comprises a load parameter storing unit, such that the analog to digital conversion unit can access the capacitive load parameters directly from the load parameter storing unit. The present invention also utilizes a mode control unit to orderly make the operation unit and the analog to digital conversion unit settled in a sleep mode, such that the electric power can be saved and the efficiency can be improved.

Figure 5:
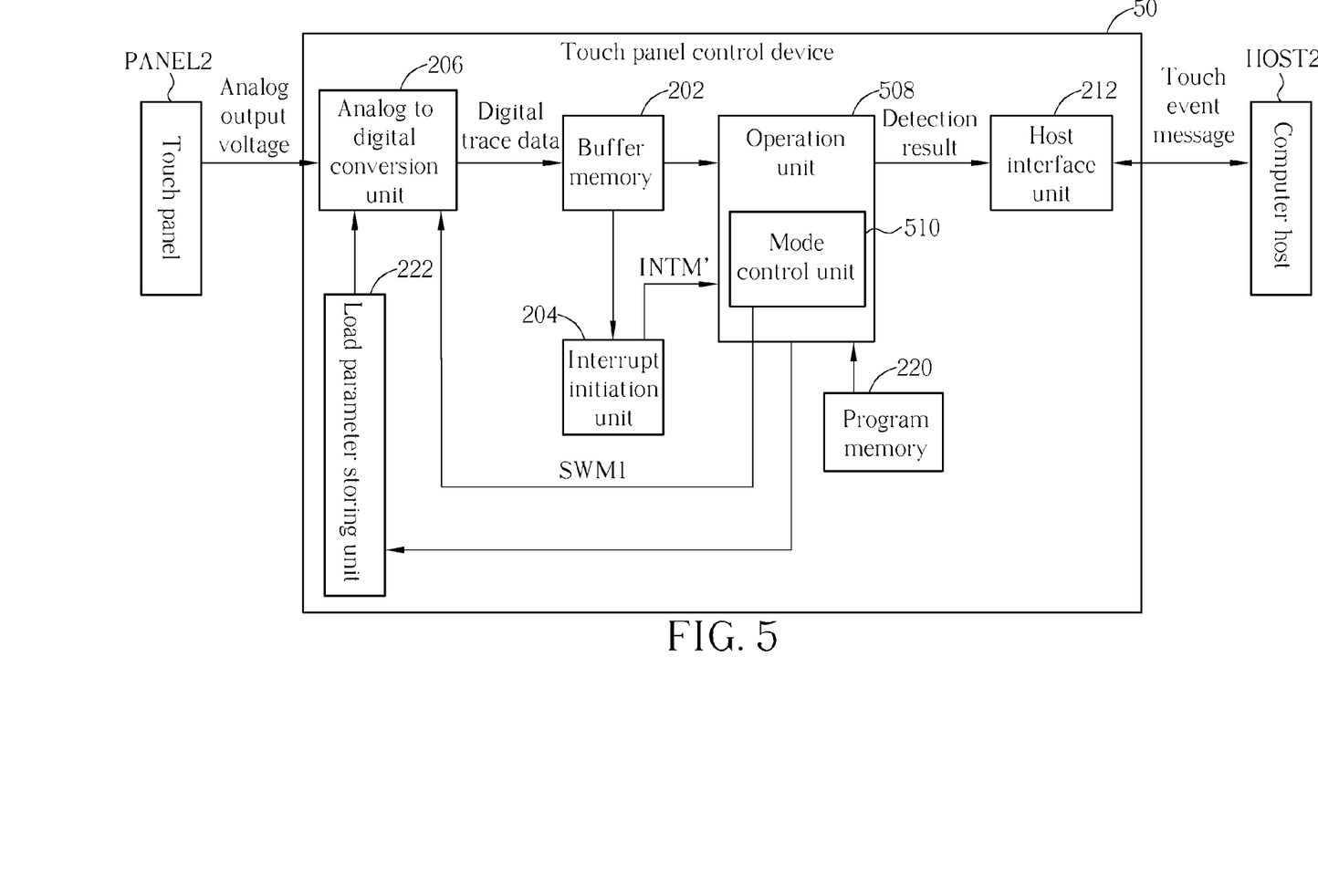
FIG. 5 illustrates a schematic diagram of a touch panel control device according to another embodiment of the present invention.

On the other hand, please refer to FIG. 5, which illustrates a schematic diagram of a touch panel control device 50 according to another embodiment of the present invention. The touch panel control device 50 is similar to the touch panel control device 20, and components and signals with similar functions are denoted by the same symbols. A main difference between the touch panel control device 50 and the touch panel control device 20 is that the touch panel control device 50 includes an operation unit 508, which includes a mode control unit 510, and thus the control signal SWM2 is not required for controlling the operation unit 508.

Under such a configuration, when the touch panel control device 50 is power on or reset, the operation unit 508 controls the load parameter storing unit 222 to update capacitive load parameters of different traces to the analog to digital conversion unit 206. Then, the mode control unit 510 sends the control signal SWM1 to switches the analog to digital conversion unit 206 to work in the active mode. Therefore, the analog to digital conversion unit 206 can convert the analog output voltages to digital trace data by referring the updated capacitive load parameters and store the digital trace data in the buffer memory 202 while the operation unit 508 enters the sleep mode for power saving. When the number of digital trace data stored in the buffer memory 202 is equal to or greater than the preset value MLEVEL, e.g. the preset value MLEVEL can be set to be equal to the digital trace data of the whole touch panel PANEL2, the interrupt initiation unit 204 generates an interrupt signal INTM' to wake up the operation unit 508 to enter into the active mode, and then the mode control unit 510 sends the control signal SWM1 to switches the analog to digital conversion unit 206 to enter the sleep mode.

Afterwards, the operation unit 508 reads the digital trace data stored in the buffer memory 202, and determines whether a valid touch event occurs. If a valid touch event occurs, the operation unit 508 outputs a corresponding detection result to the host interface unit 212, and the host interface unit 212 outputs a touch event message, e.g. coordinates data, to the computer host HOST2; if a valid touch event does not occur, the operation unit 508 does not outputs a detection result. Then, the mode control unit 510 sends the control signal SWM1 to switches the analog to digital conversion unit 206 to work in the active mode again, and the above operations are repeated. As a result, the analog to digital conversion unit 206 and the operation unit 708 can enter the sleep mode alternatively by utilizing the control signal SWM1 and the interrupt signal INTM', so as to save power.

Figure 6:
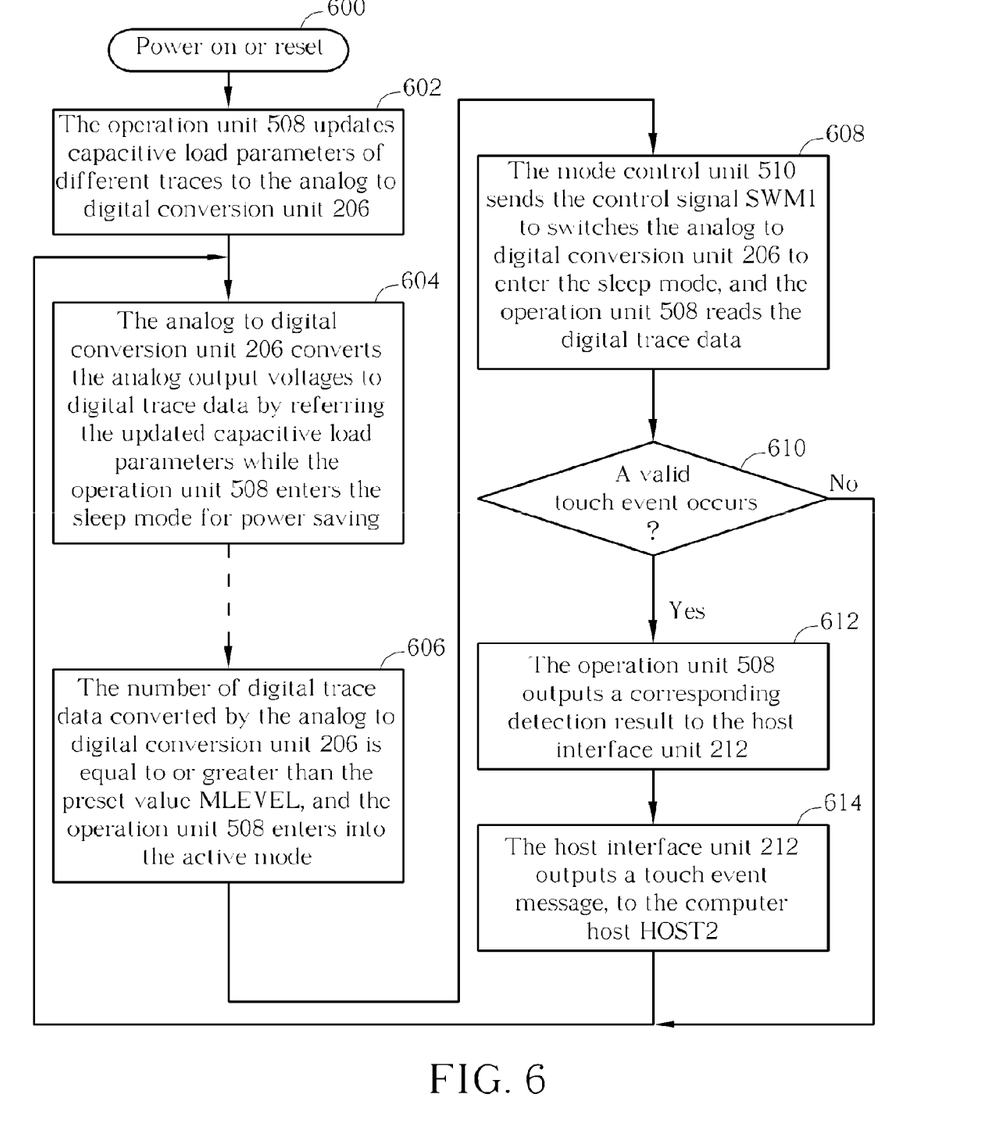
FIG. 6 is a schematic diagram of a process according to an embodiment of the present invention.

Operations of the touch panel control device 50 can be summarized into a process 60 shown in FIG. 6. The process 60 includes the following steps:

STEP 600: Power on or reset.

STEP 602: The operation unit 508 updates capacitive load parameters of different traces to the analog to digital conversion unit 206.

STEP 604: The analog to digital conversion unit 206 converts the analog output voltages to digital trace data by referring the updated capacitive load parameters while the operation unit 508 enters the sleep mode for power saving.

STEP 606: The number of digital trace data converted by the analog to digital conversion unit 206 is equal to or greater than the preset value MLEVEL, and the operation unit 508 enters into the active mode.

STEP 608: The mode control unit 510 sends the control signal SWM1 to switches the analog to digital conversion unit 206 to enter the sleep mode, and the operation unit 508 reads the digital trace data.

STEP 610: The operation unit 508 determines whether a valid touch event occurs. If yes, go to STEP 612; otherwise, go to STEP 604.

STEP 612: The operation unit 508 outputs a corresponding detection result to the host interface unit 212.

STEP 614: The host interface unit 212 outputs a touch event message, to the computer host HOST2.

Detailed operations of the process 60 can be derived by referring to the above descriptions, and other operations of the touch panel control device 50 are similar to those of the touch panel control device 20, which are not narrated hereinafter.

Figure 7:
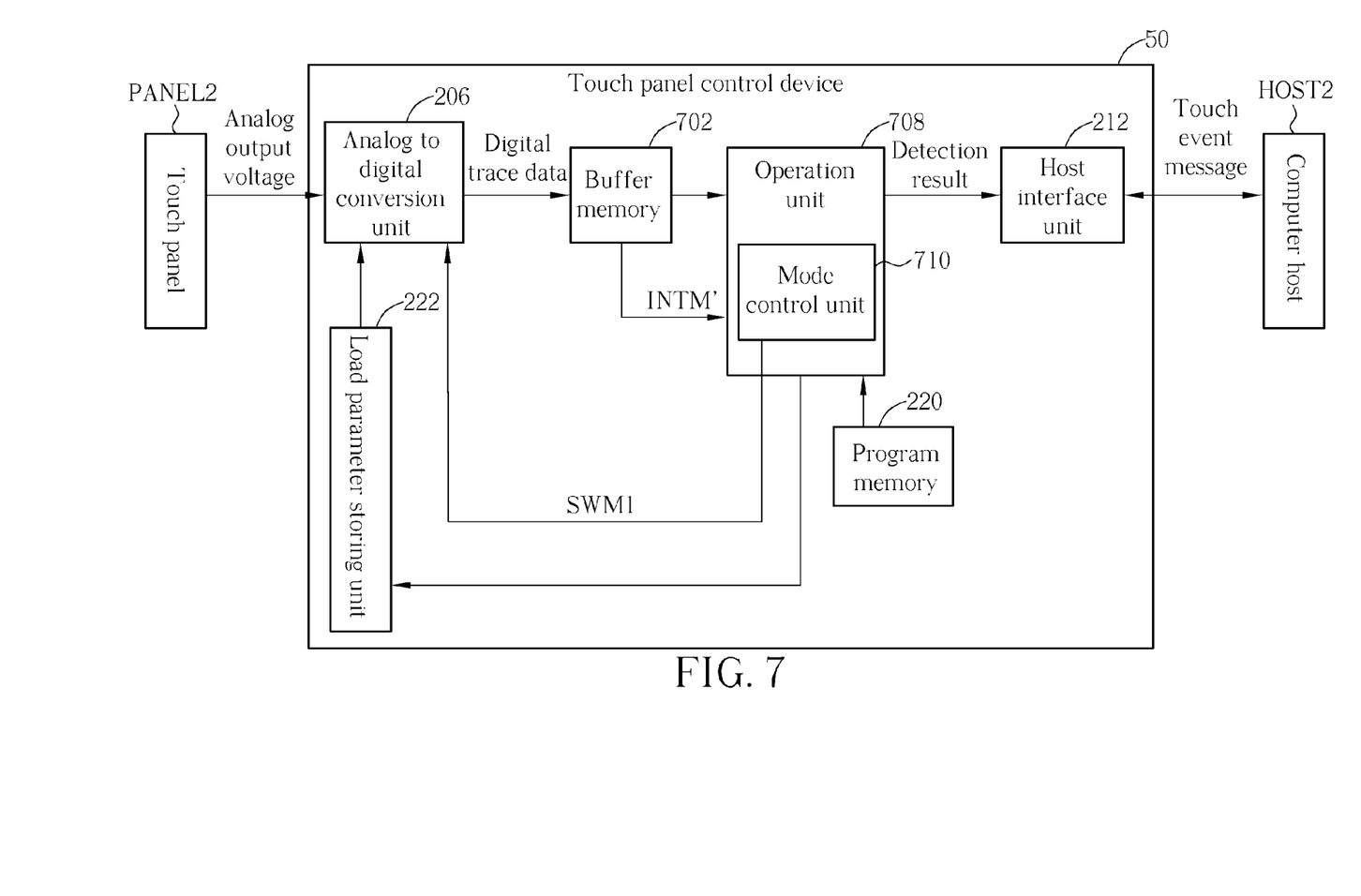
FIG. 7 illustrates a schematic diagram of a touch panel control device according to another embodiment of the present invention.

Furthermore, please refer to FIG. 7, which illustrates a schematic diagram of a touch panel control device 70 according to another embodiment of the present invention. The touch panel control device 70 is similar to the touch panel control device 20, and components and signals with similar functions are denoted by the same symbols. A main difference between the touch panel control device 70 and the touch panel control device 20 is that the touch panel control device 70 includes a buffer memory 702 capable of generating an interrupt signal INTM' and an operation unit 708, which includes a mode control unit 710, and thus the interrupt initiation unit 204 and the control signal SWM2 are not required for controlling the operation unit 708.

Under such a configuration, when the touch panel control device 70 is power on or reset, the operation unit 708 controls the load parameter storing unit 222 to update capacitive load parameters of different traces to the analog to digital conversion unit 206. Then, the mode control unit 710 sends the control signal SWM1 to switches the analog to digital conversion unit 206 to work in the active mode. Therefore, the analog to digital conversion unit 206 can convert the analog output voltages to digital trace data by referring the updated capacitive load parameters and store the digital trace data in the buffer memory 202 while the operation unit 708 enters the sleep mode for power saving. When the number of digital trace data stored in the buffer memory 702 is equal to or greater than the preset value MLEVEL, e.g. the preset value MLEVEL can be set to be equal to the digital trace data of the whole touch panel PANEL2, the buffer memory 702 generates the interrupt signal INTM to wake up the operation unit 708 to enter into the active mode, and then the mode control unit 710 sends the control signal SWM1 to switches the analog to digital conversion unit 206 to enter the sleep mode.

Afterwards, the operation unit 708 reads the digital trace data stored in the buffer memory 202, and determines whether a valid touch event occurs. If a valid touch event occurs, the operation unit 708 outputs a corresponding detection result to the host interface unit 212, and the host interface unit 212 outputs a touch event message, e.g. coordinates data, to the computer host HOST2; if a valid touch event does not occur, the operation unit 708 determines whether the touch panel PANEL2 is not touched for more than a specific time, i.e. for a long time. If the touch panel PANEL2 is not touched for more than the specific time, the operation unit 708 enters the sleep mode as well and waits for a wake-up signal sent by the computer host HOST2 to wake up to the active mode; if the touch panel PANEL2 is not touched for no more than the specific time, the operation unit 708 does not enter the sleep mode. Then, when the operation unit 708 operates in the active mode, the mode control unit 710 sends the control signal SWM1 to switches the analog to digital conversion unit 206 to work in the active mode again, and the above operations are repeated. As a result, the analog to digital conversion unit 206 and the operation unit 708 can enter the sleep mode alternatively by utilizing the control signal SWM1 and the interrupt signal INTM', so as to save power.

Figure 8:
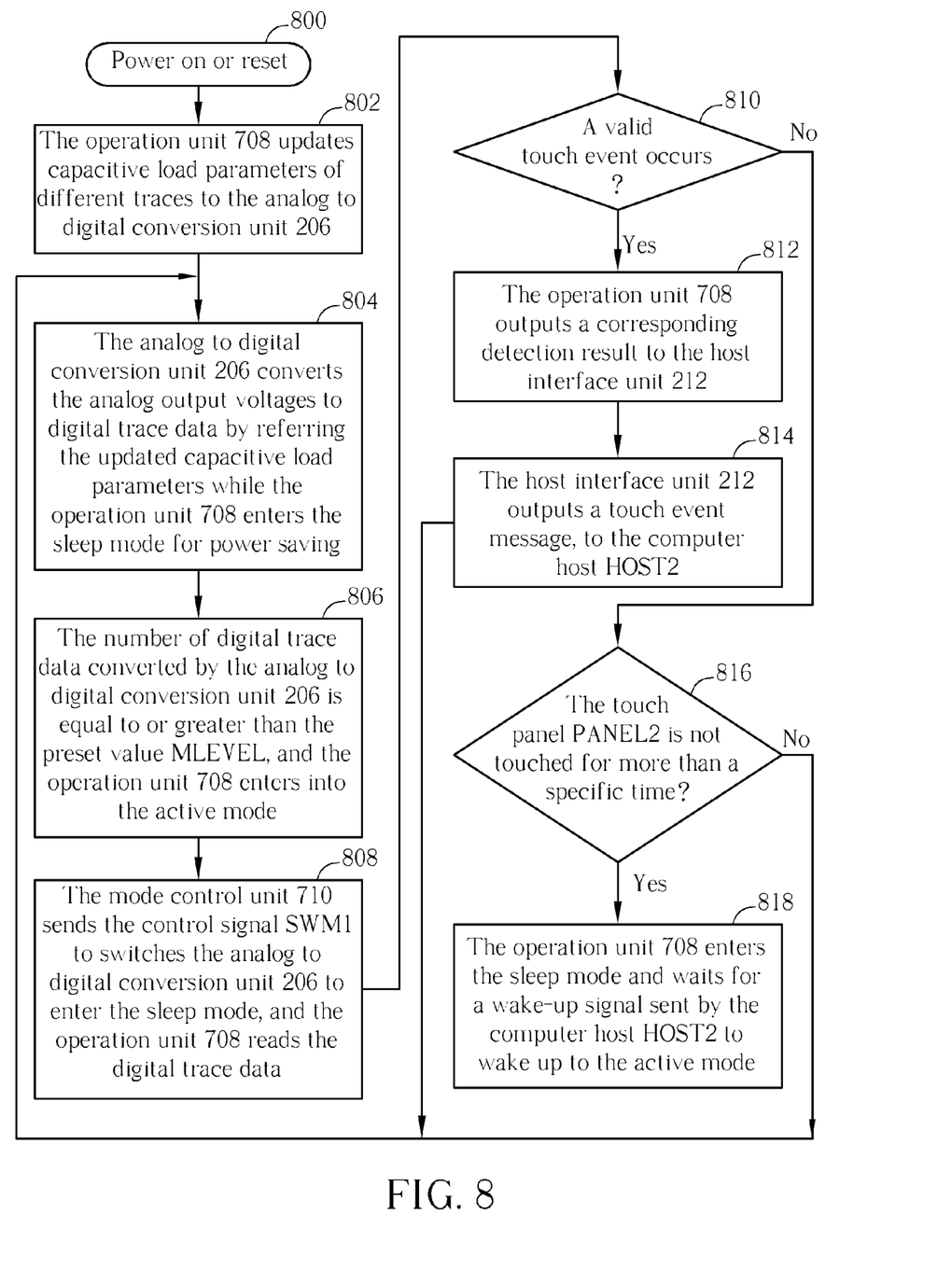
FIG. 8 is a schematic diagram of a process according to another embodiment of the present invention.

Operations of the touch panel control device 70 can be summarized into a process 80 shown in FIG. 8. The process 80 includes the following steps:

STEP 800: Power on or reset.

STEP 802: The operation unit 708 updates capacitive load parameters of different traces to the analog to digital conversion unit 206.

STEP 804: The analog to digital conversion unit 206 converts the analog output voltages to digital trace data by referring the updated capacitive load parameters while the operation unit 708 enters the sleep mode for power saving.

STEP 806: The number of digital trace data converted by the analog to digital conversion unit 206 is equal to or greater than the preset value MLEVEL, and the operation unit 708 enters into the active mode.

STEP 808: The mode control unit 710 sends the control signal SWM1 to switches the analog to digital conversion unit 206 to enter the sleep mode, and the operation unit 708 reads the digital trace data.

STEP 810: The operation unit 708 determines whether a valid touch event occurs. If yes, go to STEP 812; otherwise, go to STEP 816.

STEP 812: The operation unit 708 outputs a corresponding detection result to the host interface unit 212.

STEP 814: The host interface unit 212 outputs a touch event message, to the computer host HOST2.

STEP 816: The operation unit 708 determines whether the touch panel PANEL2 is not touched for more than a specific time. If yes, go to STEP 818; otherwise, go to STEP 804.

STEP 818: The operation unit 708 enters the sleep mode and waits for a wake-up signal sent by the computer host HOST2 to wake up to the active mode.

Detailed operations of the process 80 can be derived by referring to the above descriptions, and other operations of the touch panel control device 70 are similar to those of the touch panel control device 20, which are not narrated hereinafter.

To make a summary, according to the present invention, the touch panel control device improves the overall efficiency of the touch panel device by utilizing a novel touch panel control method and device architecture. Also, according to the experiment, the touch panel control method and the device architecture disclosed by the present invention can effectively perform the touch panel function, and reduce the power consumption of the touch panel device, and the consumer benefits can be advanced by extending the standby time of the touch panel device.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An energy-efficient touch panel control method comprising:
 transforming a plurality of analog output voltages into a plurality of digital trace data according to a plurality of capacitive load parameters by an analog to digital conversion unit;
 storing the plurality of the digital trace data into a buffer memory; and
 controlling operating modes of the analog to digital conversion unit and an operation unit according to a data number of the data stored in the buffer memory;
 wherein the analog to digital conversion unit is operated in a sleep mode, and the operation unit is operated in an active mode when the data number is greater than or equal to a predefined value, such that the operation unit processes the data stored in the buffer memory; and wherein the analog to digital conversion unit is operated in an active mode, and the operation unit is operated in a sleep mode, after the operation unit completes processing the data stored in the memory buffer.

2. The touch panel control method of claim 1 further comprising storing the plurality of the capacitive load parameters.

3. The touch panel control method of claim 1 further comprising:
   updating the plurality of capacitive load parameters to the analog to digital conversion unit while the touch panel control device is power on or reset.

4. The touch panel control method of claim 1, wherein the predefined value is less than or equal to the memory size of the buffer memory.

5. The touch panel control method of claim 1, wherein the operation unit enters the sleep mode when a touch panel is not touched for more than a specific time.

* * * * *